United States Patent
Choi et al.

(10) Patent No.: US 7,542,441 B2
(45) Date of Patent: Jun. 2, 2009

(54) RESOURCE ALLOCATION METHOD IN A MULTICARRIER COMMUNICATION SYSTEM

(75) Inventors: Young-June Choi, Seoul (KR); Sang-Boh Yun, Seongnam-si (KR); Won-Hyoung Park, Seoul (KR); Sae-Woong Bahk, Seoul (KR); Jong-Tack Kim, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 528 days.

(21) Appl. No.: 11/167,686

(22) Filed: Jun. 27, 2005

(65) Prior Publication Data

US 2005/0288030 A1 Dec. 29, 2005

(30) Foreign Application Priority Data

Jun. 25, 2004 (KR) ........................ 10-2004-0048092

(51) Int. Cl.
*H04W 4/00* (2006.01)
(52) U.S. Cl. .................... 370/328; 455/451; 455/452.2; 455/450
(58) Field of Classification Search ................ 455/450, 455/451, 452.2, 453
See application file for complete search history.

(56) References Cited

U.S. PATENT DOCUMENTS

| | | | | |
|---|---|---|---|---|
| 7,069,009 | B2 * | 6/2006 | Li et al. | 455/446 |
| 7,352,767 | B2 * | 4/2008 | Jang | 370/431 |
| 7,383,045 | B2 * | 6/2008 | Tamura et al. | 455/433 |
| 2002/0119781 | A1 | 8/2002 | Li et al. | |
| 2005/0111350 | A1 * | 5/2005 | Kano | 370/216 |
| 2006/0160549 | A1 * | 7/2006 | Sato et al. | 455/503 |
| 2008/0076432 | A1 * | 3/2008 | Senarath et al. | 455/442 |

FOREIGN PATENT DOCUMENTS

| | | |
|---|---|---|
| CN | 1484906 | 3/2004 |
| DE | 198 00 953 | 7/1999 |
| EP | 0 946 073 | 9/1999 |
| WO | WO 02/31991 | 4/2002 |

* cited by examiner

*Primary Examiner*—Charles N Appiah
*Assistant Examiner*—Joy K Contee
(74) *Attorney, Agent, or Firm*—The Farrell Law Firm, PC

(57) ABSTRACT

A resource allocation method in a multicarrier communication system where a base station allocates resources to a plurality of mobile stations according to feedback channel information from the mobile stations. The base station receives a resource request message from each mobile station and selects a set of mobile stations offering a maximum system gain without overlapped resources at a specific point in time based on the resource request messages from all mobile stations in the system. The requested resources and then allocated to the selected mobile stations.

8 Claims, 7 Drawing Sheets

RESOURCE ALLOCATION METHOD IN A MULTICARRIER COMMUNICATION SYSTEM

PRIORITY

This application claims priority under 35 U.S.C. § 119 to an application entitled "Resource Allocation Method in a Multicarrier Communication System" filed in the Korean Intellectual Property Office on Jun. 25, 2004 and assigned Ser. No. 2004-48092, the contents of which are incorporated herein by reference.

BACKGROUND OF THE INVENTION

1. Field of the Invention

The present invention relates generally to a mobile communication system, and in particular, to a resource allocation method in a multicarrier communication system.

2. Description of the Related Art

Along with the development of mobile communication technology, diverse and complex resource allocation techniques have been proposed to optimize system performance. Before packet-based architecture, a voice cellular network allocated one dedicated channel per user when requesting resources. With packet-based architecture, however, a plurality of users shares a single channel for communications.

FIG. 1 illustrates resource allocation in a conventional single-channel sharing scheme. Referring to FIG. 1, a scheduler 103 in a base station (BS) prioritizes mobile stations 105a to 105d based on their feedback channel status information. The scheduler 103 multiplexes data temporarily stored in transmission buffers 102a to 102d for the respective mobile stations 105a to 105d according to their priority levels using a channel allocator 104 and transmits the multiplexed data through a transmit antenna 106.

In the above single-channel sharing communication system, system performance depends on scheduling. Despite good-performance scheduling, there are limits on high-speed data transmission since there is only a single channel shared among a plurality of users.

A system based on the next-generation communication technology, OFDM (Orthogonal Frequency Division Multiplexing) can configure multiple channels by means of a plurality of orthogonal subcarriers, which renders resource allocation more flexible. Also, when a MIMO (Multiple Input Multiple Output) scheme or an array antenna is used, resources can be allocated to a plurality of users simultaneously.

One new trend in the mobile communication technology is direct feedback of the channel status information of each channel from a mobile station.

In a high-speed wireless communication system like CDMA HDR (Code Division Multiple Access High Data Rate), a mobile station feeds channel status measurement back to the base station. Based on the channel status information, a base station schedules data for transmission and applies an appropriate modulation and coding to each channel. Along with the increasing number of channels, the volume of information directed from the mobile station to the base station increases, and each base station needs to allocate two or more channels to achieve diversity, in the next-generation wireless communication system. Hence, there is a need for effectively allocating resources when each user requests two or more channels.

For the OFDM system, an optimal resource allocation that maximizes the system throughput can be found by trying all possible combinations. Yet, the computational complexity of finding the optimal resource allocation is NP-hard (Non-deterministic Polynomial-time hard). "NP-hard" is a well known term in computational complexity theory, NP-hard refers to the class of decision problems that contains all problems H such that for every decision problem L in NP there exists a polynomial-time many-one reduction to H, written L=<H. Thus, its practical implementation is impossible.

SUMMARY OF THE INVENTION

Accordingly, it is an object of the present invention to provide a resource allocation method for reducing the computational complexity of resource allocation and enabling efficient resource management in a multicarrier wireless communication system where two or more channels are allocated to each mobile station.

The above object is achieved by providing a resource allocation method in a multicarrier communication system.

According to one aspect of the present invention, a resource allocation method is provided for a multicarrier communication system with a base station that allocates resources to a plurality of mobile stations according to feedback channel information from the mobile stations. The base station receives a resource request message from each mobile station, selects a set of mobile stations offering a maximum system gain without overlapped resources at a time point based on the resource request messages from all mobile stations, and allocates to the selected mobile stations resources requested by the selected mobile stations.

It is preferred that the resource request message includes at least one resource index set and a utilization efficiency, i.e. a value indicating a utilization ratio, attainable when resources corresponding to the at least one resource index set are allocated.

It is preferred that the system gain is the sum of utilities and the utilization efficiency is calculated using the signal to noise ratios (SNRs), bit error rates (BERs) or packet error rates (PERs) of the resources corresponding to the at least one resource index set.

According to another aspect of the present invention, in a channel information transmitting method in a mobile station in a multicarrier communication system where a base station allocates resources to a plurality of mobile stations according to feedback channel information from the mobile stations, the mobile station generates at least one resource index set including at least one resource considering the quality of service (QoS) requirement of an on-going service or a diversity condition, calculates a utilization efficiency attainable when resources corresponding to the at least one resource index set are allocated to the mobile station, and transmits to the base station information indicating the at least one resource index set and the utilization efficiency.

It is also preferred that the utilization efficiency is calculated using the SNRs of the resources corresponding to the at least one resource index set. In the resource index set generation step, an SNR threshold is set for each channel, and a resource having an SNR less than the SNR threshold is excluded from consideration.

It is further preferred that the utilization efficiency is calculated using the BERs of the resources corresponding to the at least one resource index set. In the resource index set generation step, a BER threshold is set for each channel, and a resource having a BER greater than the BER threshold is excluded from consideration.

It is preferred that the utilization efficiency is calculated using the PERs of the resources corresponding to the at least one resource index set. In the resource index set generation step, a PER threshold is set for each channel, and a resource having a PER greater than the PER threshold is excluded from consideration.

According to a further aspect of the present invention, in a resource allocation method in a MIMO communication system where a base station allocates resources to a plurality of mobile stations according to feedback channel information from the mobile stations, the base station receives a channel request message from each mobile station, selects a set of mobile stations offering a maximum system output without overlapped channels at a time point based on the channel request messages from all mobile stations, and allocates to the selected mobile stations channels corresponding to antennas requested by the selected mobile stations.

It is preferred that the channel request message includes at least one antenna index set and a utilization efficiency attainable when channels corresponding to the at least one antenna index set are allocated.

It is preferred that the system output is the sum of utilities and the utilization efficiency is calculated the SNRs, BERs or PERs of the channels corresponding to antennas indicated by the at least one antenna index set.

According to still another aspect of the present invention, in a resource allocation- method in an OFDMA (Orthogonal Frequency Division Multiple Access) communication system where a base station allocates resources to a plurality of mobile stations according to feedback channel information from the mobile stations, the base station receives a subchannel request message from each mobile station, a subchannel being formed by a plurality of subcarriers, selects a set of mobile stations offering a maximum system output without overlapped subchannels at a time point based on the subchannel request messages from all mobile stations, and allocates to the selected mobile stations subchannels requested by the selected mobile stations.

It is preferred that the subchannel request message includes at least one subchannel index set and a utilization efficiency attainable when subchannels corresponding to the at least one subchannel index set are allocated.

It is preferred that the system output is the sum of utilities and the utilization efficiency is calculated using the SNRs, BERs or PERs of the subchannels corresponding to the at least one subchannel index set.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
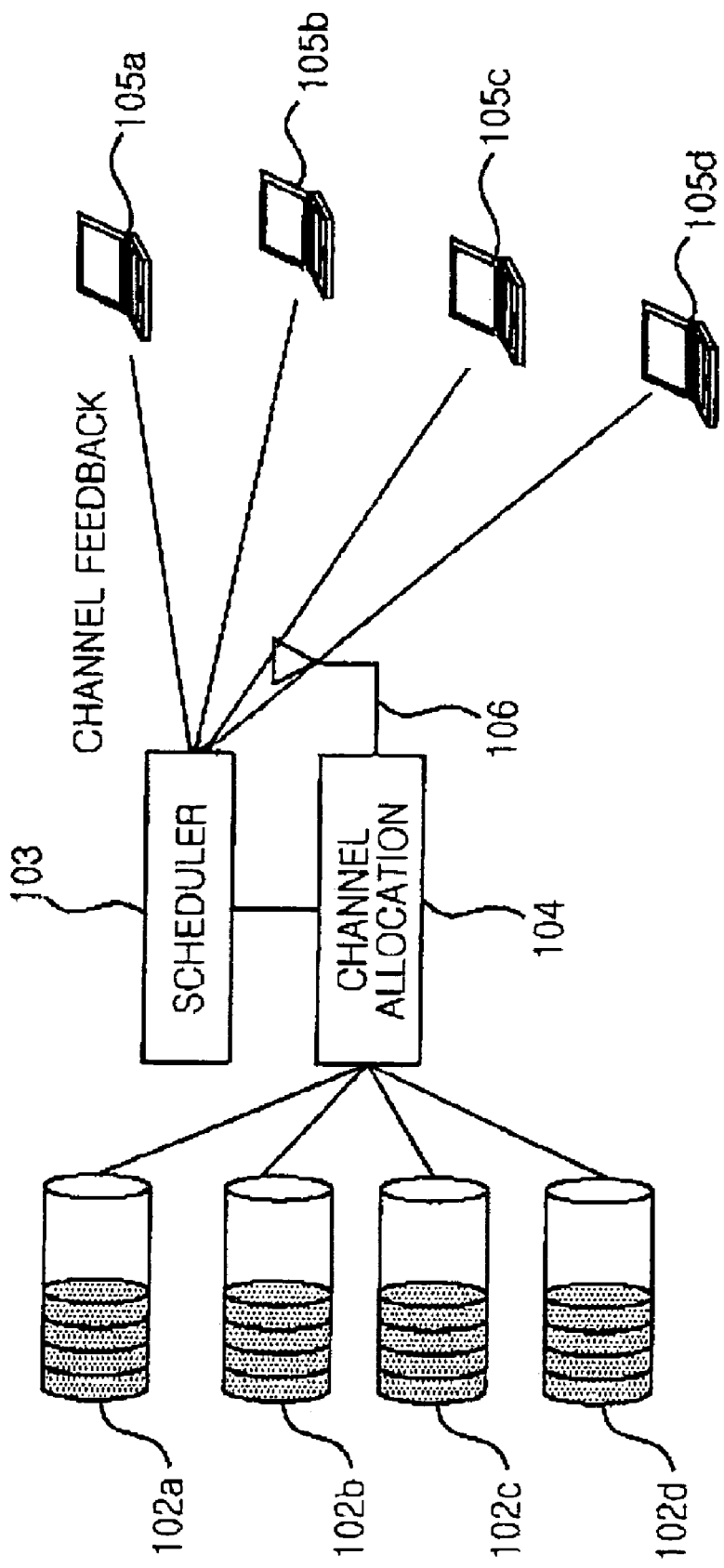
FIG. 1 illustrates a system configuration for resource allocation in a conventional single-channel sharing scheme.
Figure 2:
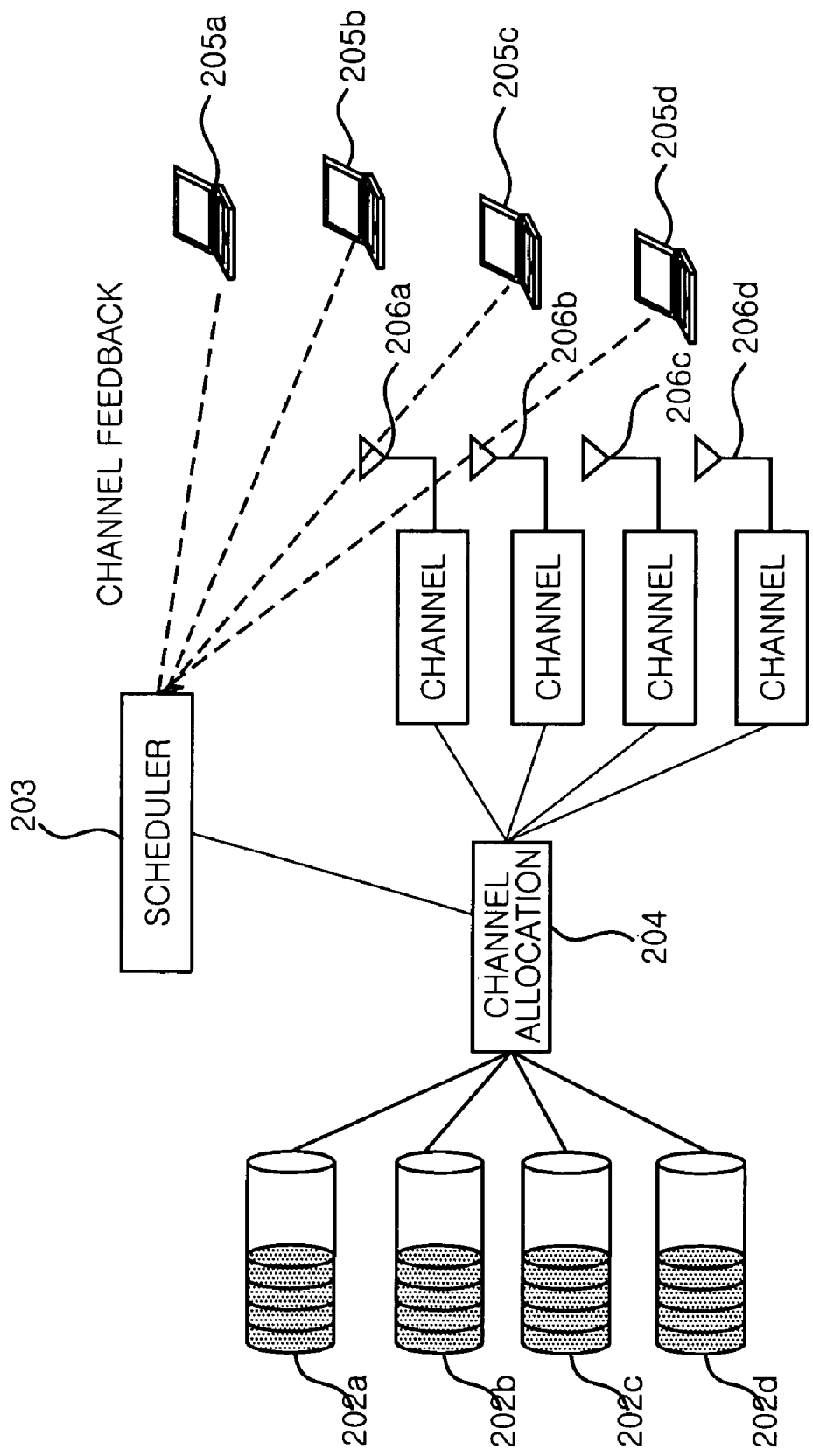
FIG. 2 illustrates a wireless communication system to which the present invention is applied.

FIG. 2 illustrates the configuration of a wireless communication system to which a resource allocation method performed in accordance with an embodiment of the present invention is applied. A scheduler 203 in a base station prioritizes mobile stations 202a to 202d, determines channels to be assigned to them based on feedback channel status information from them, and tells a channel allocator 204 the priority levels and assigned channels of the mobile stations 202a to 202d. The channel allocator 204 assigns data temporarily stored in transmission buffers 102a to 102d, which correspond to the mobile stations 202a to 202d, to the channels according to the priority levels and channel assignment information received from the scheduler 203. The data is then transmitted via antennas 205a to 205d, which also correspond to their respective channels.

In accordance with the present invention, each mobile station notifies the base station of the gains from a plurality of channels. The base station analyzes the channel gain information and assigns two or more resources to each mobile station. The resulting diversity effect improves the total system performance.

Assuming that the mobile station selects one or more desired channel sets and reports the gains of the selected channels to the base station, the base station assigns resources to the mobile station, considering the desired channels. In this embodiment of the present invention only one channel set is selected and reported to the base station, but is not limited to only one channel. The mobile station can report to the base station two or more channel sets or all possible combination channel sets together with their yields and/or BERs.

For a better understanding of the resource allocation method according to a preferred embodiment of the present invention, assume user 1 achieves a gain of 4 with resources 1 and 2; user 2 achieves a gain of 6 with resources 1 and 3; user 3 achieves a gain of 5 with resources 2 and 3 or a gain of 4 with resource 4; and user 4 achieves a gain of 5 with resources 2 and 4 or a gain of 2 with resource 3. The total gain is maximized without overlapping resources by assigning resources 1 and 3 to user 1 and assigning resources 2 and 4 to user 4, as illustrated in Table 1.

TABLE 1

Resource Allocation Table

|        | Resource index | Gain |
|--------|----------------|------|
| User 1 | 1, 2           | 4    |
| User 2 | 1, 3           | 6    |
| User 3 | 2, 3           | 5    |
|        | 4              | 4    |
| User 4 | 2, 4           | 5    |
|        | 3              | 2    |

The present invention provides an algorithm that maximizes a specific value by assigning specific resources to specific mobile stations as a function of a mobile station request. When the gain is the same for each user, the problem comes down to allocating resources to as many mobile stations as possible. Considering real communication quality, the values can be PERs (Packet Error Rates). In the present invention, the optimal resource allocation problem is solved by a theoretical graphing approach in a manner that reduces computational complexity.

In the channel environment described in Table 1, each mobile station calculates the utilization efficiency of two or more resources assigned to the mobile station and reports the indexes and utilization efficiency of the selected resources to the base station. Notably, the number of the selected resources is at least 2. In an extreme case, the mobile station can calculate the utilities for all resource combinations and send the utilization efficiency information to the base station. The utilization efficiency can be a user throughput or a PER depending on the purpose of the system. For example, in a MIMO system, the PER with high SNR is given as $P_e(SNR) = b \cdot SNR^{a\alpha}$ where $\alpha$ is a diversity gain and a and b are modulation variables.

After receiving the channel information from each mobile station, the base station generates a graph for the mobile station as a function of the channel information.

The total utilization efficiency of the system is determined according to resource allocation to users. Therefore, a theoretical graphing approach is taken that allocates resources to maximize the total system utilization efficiency. Table 1, therefore, can be expressed as resource sets: (1, 2)1=4, (1, 3)2=6, (2, 3)3=5,(4)3=4, (2, 4)4=5, and (3)4=2.

The notation, $(a_{n1}, \ldots, a_{ni})_j = w$, defines the weight (i.e. utilization efficiency), w attainable by selecting a resource set $\{a_{n1}, \ldots, a_{ni}\}$ for user j. Knowing the assignment sets, the base station generates a resource allocation graph as shown in FIG. 3, which illustrates a resource allocation graph to be referred to for describing a resource allocation method according to a preferred embodiment of the present invention.

Figure 3:
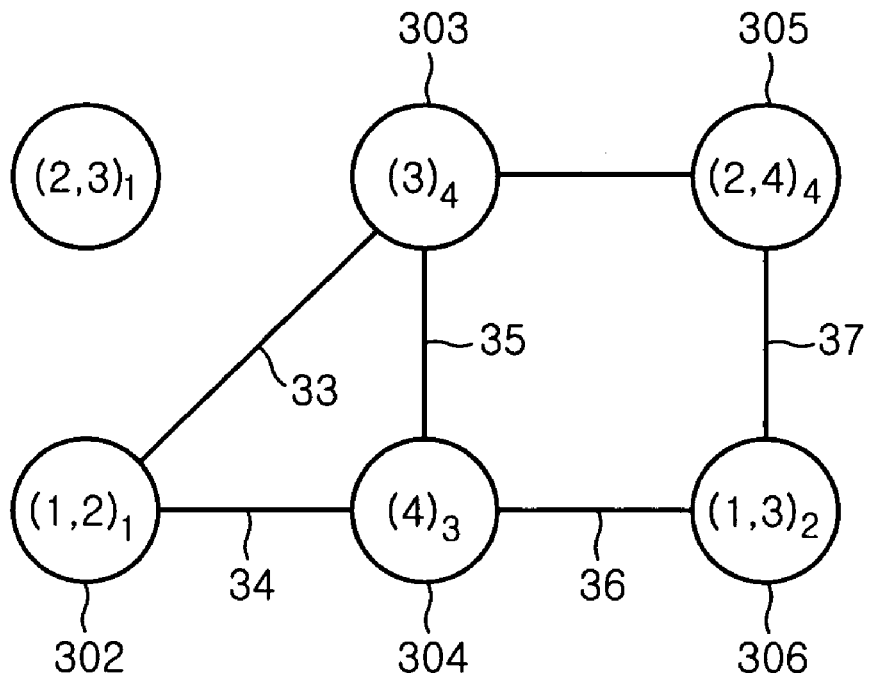
FIG. 3 illustrates a resource allocation graph for a resource allocation method according to an embodiment of the present invention.

Referring to FIG. 3, the resource allocation graph is created by a vertex (i.e. node) for a candidate allocation set. A weight is assigned to the vertex, and then an edge is drawn between any two vertices with completely different resources and users. Thus, a node 302 of user 1 requesting resource 1 and resource 2 is connected to a node 303 for user 4 requesting resource 3 by a link 33. The node 302 is also connected to a node 304 for user 3 requesting resource 4 by a link 34. The node 303 is connected to the node 304 by a link 35 because they have different resources and different users. The node 304 is also connected to a node 306 for user 2 requesting resource 1 and resource 3 by a link 36. Lastly, the node 306 is connected to a node 305 for user 4 requesting resource 2 and resource 4 by a link 37.

Cliques are found from the-generated resource allocation graph and a clique having a maximum sum of weights is selected as an optimal resource allocation.

Given the maximum number of multiple resources within a range that the system can compute, a parallel division algorithm or a serial division algorithm is used for searching a clique.

An optimal resource allocation which offers a maximum system utilization efficiency can be determined using the resource allocation graph drawn in the above-described manner. However, as the number of resources increases, so does the complexity of the process of finding the optimal resource allocation. In this context, it is assumed that the maximum number of multiple resources, n is given so that the system can find the optimal resource allocation in real time. If the number of resources exceeds n, an approximate optimal allocation method is used in which the resources are divided by n. A parallel division algorithm or a serial division algorithm is used for the approximate optimal allocation.

The parallel division algorithm divides the total resources and users into g groups and applies the optimal allocation algorithm to each group, so that a user is allotted to only the resources within his group. If each group has $m_i$ resources, $m_i$ being equal to or less than $m_p$ that allows optimal resource allocation, the total number of resources is computed by Equation (1):

$$m = \sum_{i=1}^{g} m_i, \, m_i \le m_p \text{ for } \forall \, i. \quad (1)$$

Letting $A_j = F(S, A_i)$ be a function to obtain an allocated resource set $A_j$ when applying an allocation strategy S being a superset of vertex sets of cliques into a resource set $A_i$. Then the algorithm is given as Equation (2):

$$\bigcup_{i=0}^{m} A_i = \{a_1, \ldots, a_m\}, |A_1| = m_i, A_i = F(Opt, A_i) \quad (2)$$

Meanwhile, the serial division algorithm repeatedly uses the optimal allocation algorithm until all resources are allocated. Subopt(n) denotes a method of finding an optimal allocation of $m_p$ resources among resources available to a user at present. In this approach, Subopt(n) is repeatedly applied to the remaining resources, thereby achieving an approximate optimal result. The algorithm is described by Equation (3):

$$A^* = \{a_1, \ldots, a_m\} \quad (3)$$
while($A^* \ne 0$ & $\exists$a feasible allocation){
   $A_i = F(Subopt(n), A^*)$
   $A^* \leftarrow A^* - A_i$
}

Opt and Subopt(n) in Equations (2) and (3) will be described below.

1) Step 1: A graph is generated using all available resources according to a user's QoS, as shown in FIG. 3. As the edge connects any two vertices only when the BS can allocate two resource sets simultaneously, a vertex c gets to know the number of neighbor vertices of c, N(c).

2) Step 2: Let $C_0$ and $C_1$ be the sets of vertices whose $N(\cdot)$ equals 0 and 1 respectively. Then, the superset S of vertex sets c of maximal cliques obtained by the algorithm is set forth in Equation (4):

$$\forall c \in C_0, S \leftarrow S \cup \{\{c\}\}$$

$$\forall c \in C_1, S \leftarrow S \cup \{\{c, b_c\}\}, N(c) \leftarrow N(c)-1 \quad (4)$$

where the symbol implies an update process.

Figure 4:
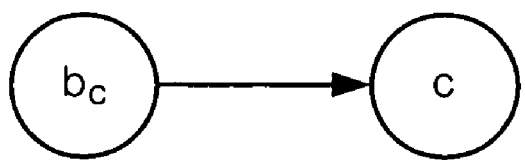
FIG. 4 illustrates a resource graph formulation in the resource allocation method according to an embodiment of the present invention.

3) Step 3: Sort all the vertices in $C-C_0-C_1$ by the increasing order of $N(\cdot)$. If all $N(\cdot)$ are equal, they are arranged randomly. For a vertex c in the sorting order, a directed graph from one of neighbor vertices of c, $b_c$ to c is created as illustrated in FIG. 4. Here, c is defined as a successor of $b_c$ and $b_c$ as a predecessor of c. For convenience sake, the directed graph is simply represented by $b_c$ c. If a directed graph is made, the edge between c and $b_c$ is deleted in the original graph and $N'(b_c)$ $N'(b_c)+1$ where $N'(x)$ is the number of successors of vertex x.

4) Step 4: For a vertex c in the sorted order and a first successor of c denoted by $c_f$, a directed graph is represented by c $c_f$. $c_f$ may already have its own successor, $c_{f,s}$, that is, $c_f$ $c_{f,s}$. Then the subgraph can be extended by c $c_f c_{f,s}$ where c is defined as a main vertex, $c_f$ as a first subvertex, and $c_{f,s}$ as a second subvertex. The main subvertex may have many first subvertices and each first subvertex may also have many second subvertices. A first vertex may be identical to a second vertex of another first vertex from the same main vertex.

For example, consider two directed graphs, $c_f c_f$, and $c_f c_f$ $c_{f,s}$. If $c_f$ and $c_{f,s}$ are the same vertex, the three vertices (c, $c_f$, $c_f$) form a clique.

Figure 5:
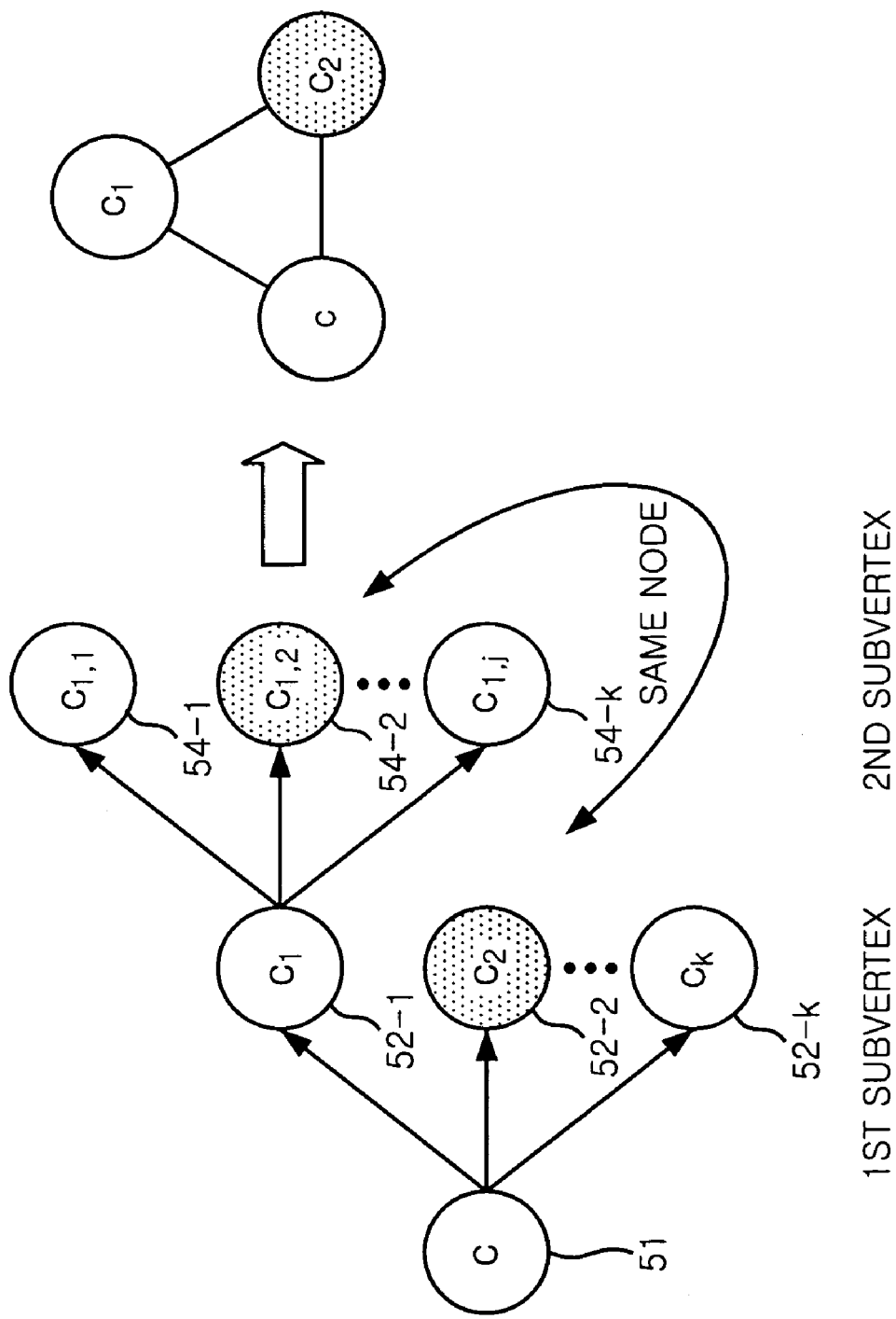
FIG. 5 illustrates an example of an operation for detecting a 3-clique in the case where three vertices form a clique in the resource allocation method according to an embodiment of the present invention.

FIG. 5 illustrates a procedure for searching 3-cliques, each being formed by three vertices.

Referring to FIG. 5, when an edge connects a first subvertex $c_2$ 52-2 of a main vertex c 52 to a second vertex $c_{1,2}$ 54-2 of another first vertex $c_1$ 52-1 of the main vertex c 51, the vertices (c, $c_1$, $c_2$) form a clique. In this manner, for all main vertices, cliques are searched for and inserted into S.

5) Step 5: An additional search is needed for larger cliques when $\min(N(c_f), N(c_{f,s}))>2$.

Figure 6:
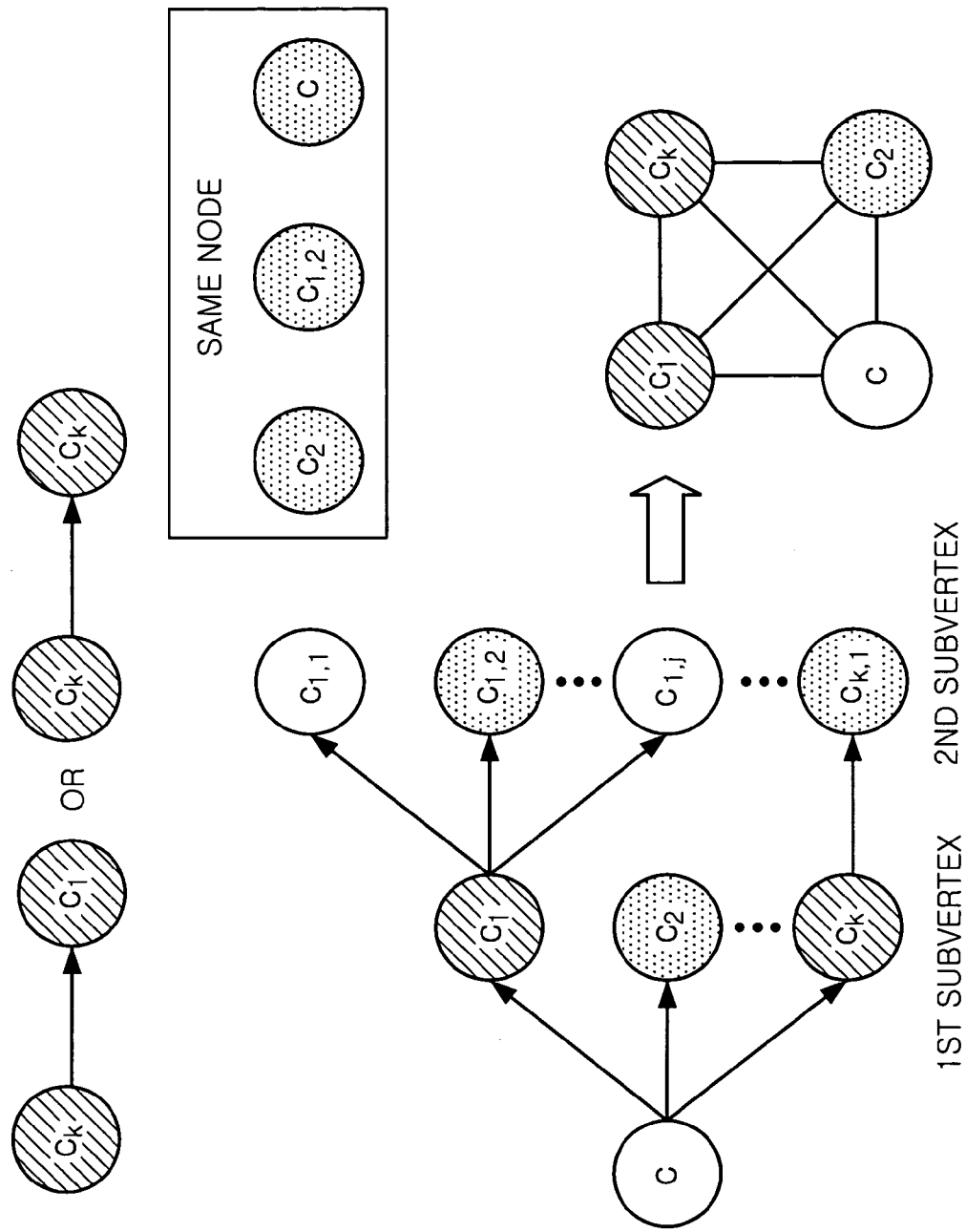
FIG. 6 illustrates an example of an operation for detecting a 4-clique in the case where four vertices form a clique in the resource allocation method according to an embodiment of the present invention.

FIG. 6 illustrates a procedure for searching 4-cliques, each being formed by four vertices.

Referring to FIG. 6, for a first subvertex $c_{f_y}$ of a main vertex c, 3-clique sets $\{c, c_{f_y}, c_{f_1}\}, \ldots, \{c, c_{f_y}, c_{f_x}\}$ are found. If $c_{f_y} \notin \{c_{f_1}, \ldots, c_{f_x}\}$, maximal cliques are found among $c_{f_1}, \ldots, c_{f_x}$. To do so, the relation among $c_{f_1}, \ldots, c_{f_x}$ is found in the previous directed graphs.

In the same manner, large cliques can further be searched. The complexity of the clique-searching algorithm increases with the size of cliques. Therefore, a reference clique size is set in the above approximate optimal allocation method and the clique searching algorithm searches for an optimal solution within the reference clique size.

In the resource allocation method according to a preferred embodiment of the present invention, a clique searching algorithm is designed as in Table 2.

TABLE 2

Pseudo Code of the Algorithm

//All resource sets, each having one or two resources for a mobile station, which
satisfies a target Pe are located at nodes in a graph and stored.
   function schedule( )
   {
      Graph G      //graph class TABLE 2-continued Pseudo Code of the Algorithm //number of all resource sets each having two BS resources
   N=BS_RESOURCE_NUM COMBINATION 2
for i=1 to MOBILE_NUM
{
   for j=1 to BS_RESOURCE_NUM
      //in the case where the target Pe is satisfied by one resource
      if Pe(I, j) < TARGET_Pe then
         G.MakeNode(i, j)
   For j=1 to N
   {
      //in the case where two resources are combined
      C=Combination(BS_RESOURCE_NUM)
      //in the case where the target Pe is satisfied by two resources
      If Pe(I, C) < TARGET_Pe then
         G.MakeNode(i, C)
   }
}
//a clique having the largest weight is found in the graph
   G.GetBestClique( )
}
//search the clique having the largest weight in the graph
function GraphGetBestClique( )
{
   maxWeight=-1;
   for i=1 to NODE_NUM
{
   // one node
      weight=Node[i].weight
      if weight > maxWeight then
         maxWeight=weight
      for j ADJACENT TO Node[i]
{
      //in the case where i and j are connected
   weight += Node[j].weight
      if weight > maxWeight then
         maxWeight=weight;
   for k ADJACENT TO Node[j]
   {
      //in the case where i, j and k are connected
      if k ADJACENT TO Node[i] and k Node[i] then
         weight += Node[k].weight
      if weight > maxWeight then
         maxWeight=weight;
      for l ADJACENT TO Node[k]
      {
         //in the case where i, j, k and l are connected
         if l ADJACENT TO Node[i] and Node[j] then
            weight += Node[l].weight
         if weight > maxWeight then
            maxWeight=weight;
      }
   }
}
}
print maxWeight
}

Figure 7:
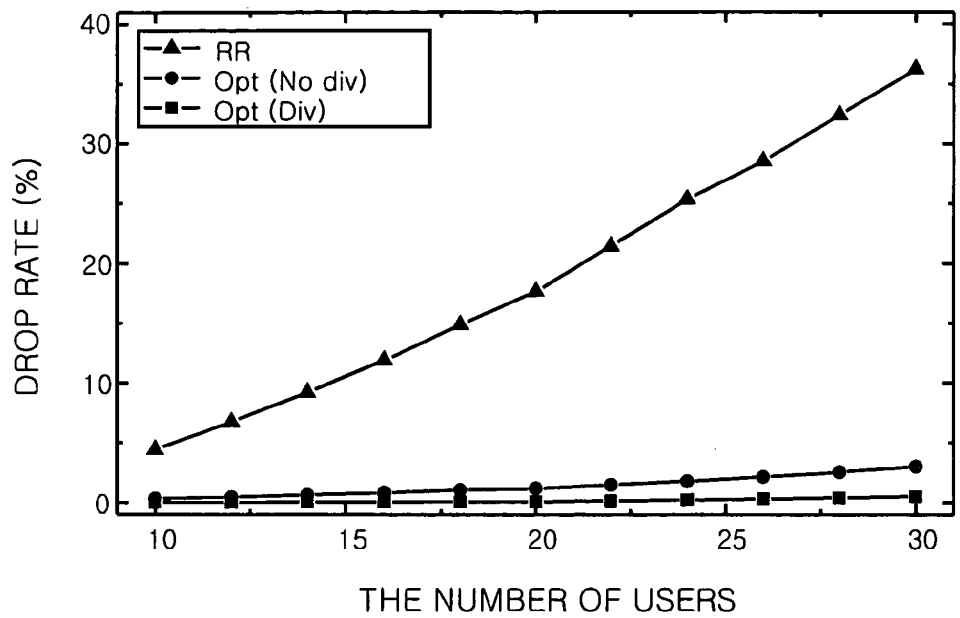
FIG. 7 is a graph illustrating computer-aided simulation results comparing packet drop rates between a the prior art resource allocation and the resource allocation of the present invention, with four resources.

FIG. 7 illustrates computer-aided simulation results comparing packet drop rates between conventional prior art round robin (RR)-based resource allocation and the resource allocation of the present invention, with four resources.

It is assumed that for four resources, a target BER is $10^{-4}$, and packets exceeding a delay bound of 20 msec in a queue are dropped, when voice packets are generated by a G.739 encoder supporting 8 kbps.

As illustrated in FIG. 7, many users can be served with a reduced packet drop rate in the optimal resource allocations (Opt) of the present invention rather than in the RR method. In the RR method, each user reports channels satisfying a target BER to the BS and the BS randomly selects a channel with the target BER for each user, sequentially. On the other hand, in the optimal resource allocation method, Opt (No div) of the present invention, each user uses one channel and tells the BS channels satisfying a target BER. Then the BS chooses resources such that the most users can be serviced. In the optimal resource allocation method, Opt (div) of the present invention, each user tells the BS one or two channel sets satisfying a target BER and the BS chooses resources such that the most users can be serviced. It is noted that the use of a plurality of channels is more efficient in terms of QoS. Only the clique searching algorithm is used in the simulation.

Herein, "No div" indicates that the resource allocation method of the present invention was simulated without the considered feedback that a mobile user computes for its utilization efficiency or QoS. "Div" indicates that the resource allocation method of the present invention was simulated with the considered feedback that a mobile user computes for its utilization efficiency or Qos.

Figure 8:
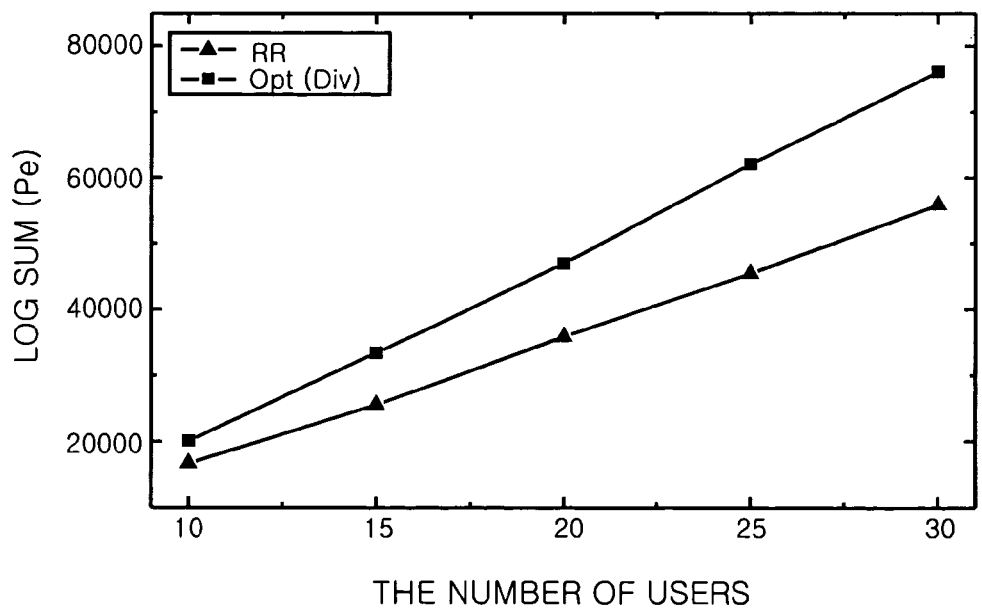
FIG. 8 is a graph illustrating computer-aided simulation results comparing gain sums between the resource allocation and the resource allocation of the present invention.

FIG. 8 illustrates simulation results comparing sums of gains between the conventional RR method and the resource allocation method of the present invention when a target function is $\Sigma-\log(Pe)$ for BER.

While the target function allocates resources to as many users as possible in FIG. 7, the RR is compared with the inventive resource allocation in terms of sum of gains when a target function is $\Sigma-\log(Pe)$ for BER in FIG. 8. As noted, the resource allocation of the present invention offers greater gains than the RR algorithm.

Figure 9:
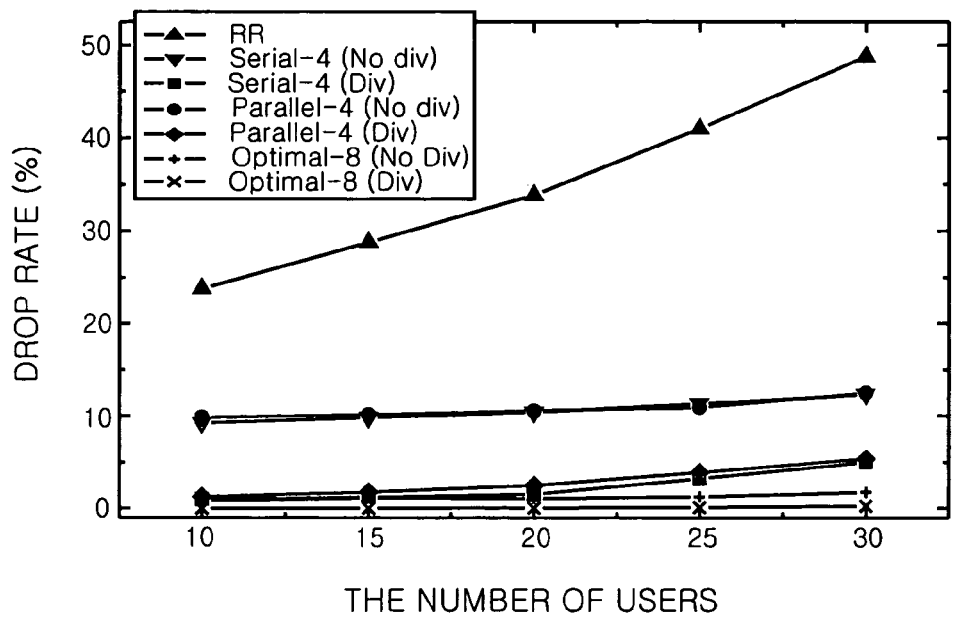
FIG. 9 is a graph illustrating simulation results comparing packet drop rates between different resource allocation algorithms with eight resources.

FIG. 9 is a graph comparing packet drop rates among resource allocation algorithms for eight resources.

The packet drop rates are plotted for a parallel-division suboptimal algorithm with $m_p=4$, a serial-division suboptimal algorithm, and an optimal selection by the clique searching algorithm that searches for up to 8-cliques. Both heuristic algorithms show similar performances and perform comparably with the optimal selection.

Figure 10:
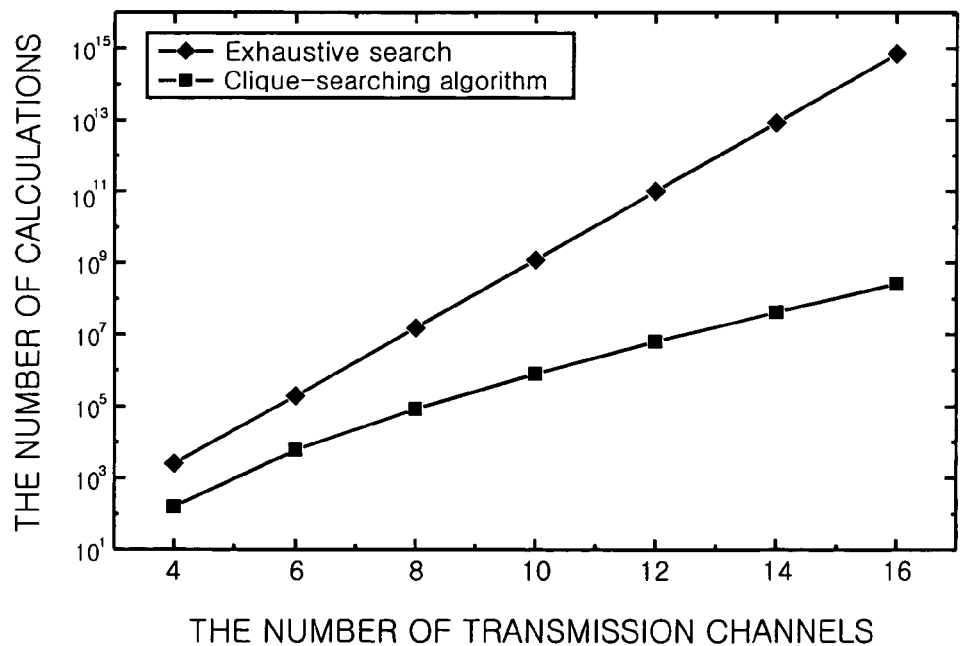
FIG. 10 is a graph illustrating simulation results comparing the number of calculations in a clique searching algorithm according to the present invention, with an exhaustive search where all possible candidate resource sets are tried.

FIG. 10 is a graph comparing the number of calculations between an exhaustive search and the clique searching algorithm without the parallel and serial division algorithms obtained by an analysis. As illustrated in FIG. 10, the clique searching algorithm of the present invention requires far less calculations than the exhaustive search.

In accordance with the present invention as described above, resources are allocated so that when users request multiple channels, the maximum number of users are served as a function of user requests, or so that the total BER or PER is minimized.

The use of the inventive resource allocation method for a multiple antenna system that configures channels for respective antennas effects transmit and receive antenna diversity and improves system performance as well.

Furthermore, if a plurality of channels can be used simultaneously and one or more channels are available to every user, the resource allocation method reduces the computational complexity in a system where multiple users can choose given channels simultaneously.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating resources in a multicarrier communication system where a base station allocates resources to a plurality of mobile stations as a function of feedback channel information from the mobile stations, the method comprising the steps of:
   receiving a resource request message from each mobile station;
   obtaining at least one resource index set and a utilization efficiency from the resource request message;
   selecting a set of mobile stations offering a maximum system gain without overlapped resources using the at least one resource index set and the utilization efficiency at a time point when the resource request messages from each mobile station is received; and
   allocating, to each of the mobile stations constituting the set, resources requested by each of the mobile stations constituting the set,
   wherein the utilization efficiency is attained when resources corresponding to the at least one resource index set are allocated to each of the mobile stations constituting the set.

2. The resource allocation method of claim 1, wherein the system gain is the sum of utilization efficiencies.

3. The resource allocation method of claim 1 wherein the utilization efficiency is calculated using one among SNRs (Signal to Noise Ratios), BERs (Bit Error Rates) and PERs (Packet Error Rates) of the resources corresponding to the at least one resource index set.

4. A method for transmitting channel information in a mobile station in a multicarrier communication system where a base station allocates resources to a plurality of mobile stations according to feedback channel information from the mobile stations, the method comprising the steps of:
   generating at least one resource index set including at least one resource considering a quality of service (QoS) requirment of an on-going service or a diversity condition;
   calculating a utilization efficiency attainable when resources corresponding to the at least one resource index set are allocated to the mobile station; and
   transmitting to the base station information indicating the at least one resource index set and the utilization efficiency,
   wherein the at least one resource index set and the utilization efficiency are used when the base station selects a set of mobile stations offering a maximum system gain without overlapped resources.

5. The method of claim 4, wherein the utilization efficiency is calculated using one among SNRs (Signal to Noise Ratios), BERs (Bit Error Rates) and PERs (Packet Error Rates) of the resources corresponding to the at least one resource index set.

6. The method of claim 5, wherein the generating step further comprises: setting an SNR threshold for each channel; and excluding a resource having an SNR less than the SNR threshold.

7. The method of claim 5, wherein the generating step further comprises:
   setting a BER threshold for each channel; and
   excluding a resource having a BER greater than the BER threshold.

8. The method of claim 5, wherein the generating step further comprises:
   setting a PER threshold for each channel; and
   excluding a resource having a PER greater than the PER threshold.

* * * * *